(12) United States Patent
Candelore et al.

(10) Patent No.: US 8,270,605 B2
(45) Date of Patent: Sep. 18, 2012

(54) LOCATION AUTHENTICATION

(75) Inventors: Brant L. Candelore, San Diego, CA (US); Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 486 days.

(21) Appl. No.: 12/584,134

(22) Filed: Sep. 1, 2009

(65) Prior Publication Data

US 2011/0055577 A1    Mar. 3, 2011

(51) Int. Cl.
H04L 9/32    (2006.01)

(52) U.S. Cl. .................. 380/240; 380/258; 713/168

(58) Field of Classification Search .............. 726/26–29; 713/168, 175–181, 189, 191; 705/50–59
See application file for complete search history.

(56) References Cited

U.S. PATENT DOCUMENTS

| | | | |
|---|---|---|---|
| 6,256,393 | B1 | 7/2001 | Safadi et al. |
| 6,791,995 | B1 | 9/2004 | Azenkot et al. |
| 2002/0124193 | A1 | 9/2002 | Colman |
| 2003/0237089 | A1 | 12/2003 | Wajs |
| 2004/0114912 | A1 | 6/2004 | Okamoto et al. |
| 2005/0289585 | A1* | 12/2005 | Pedlow et al. ............ 725/29 |
| 2006/0064201 | A1 | 3/2006 | Chirnomas |
| 2007/0294178 | A1* | 12/2007 | Pinder et al. ............ 705/57 |

OTHER PUBLICATIONS

ITU-T Rec. J.83:1997 Digital multi-programme systems for television, sound and data services for cable distribution. Geneva: International Telecommunication Union, Apr. 1997.

ISO/IEC 13818-1:2000, Information Technology—Coding of moving pictures and associated audio—Part 1: Systems. Geneval: International Organization for Standardization/International Electrotechnical Commission, Dec. 2000.

B.P. Lathi, Signals, System and Controls. New York: Harper & Row, 1974, pp. 207-214 and pp. 428-456.

A. Bruce Carlson, Communication Systems, $3^{rd}$ ed. New York: McGraw-Hill, 1986, pp. 514-517 and pp. 550-554.

Edward A. Lee and David G. Messerschmitt, Digital Communication, $2^{nd}$ ed. Boston: Kluwer Academic, 1994, pp. 442-550.

Richard E. Blahut, Digital Transmission of Information. New York: Addison-Wesley, 1990, pp. 159-170.

* cited by examiner

Primary Examiner — Gilberto Barron, Jr.
Assistant Examiner — Malcolm Cribbs
(74) Attorney, Agent, or Firm — Miller Patent Services; Jerry A. Miller

(57) ABSTRACT

In one implementation a method of authenticating the installation of a television receiver involves generating a fingerprint value as function of the television network characteristics at an authorized installation location, where the fingerprint is a function of at least one of a gain value of a variable gain amplifier and an equalizer coefficient of an adaptive equalizer of the television appliance; receiving a code that is a function of both a decryption key and the fingerprint value from a broadcast source; ascertaining a value of the decryption key by applying an inverse function to the code that produces the decryption key as an output; and carrying out a decryption process at the television receiver appliance using the decryption key. This abstract is not to be considered limiting, since other embodiments may deviate from the features described in this abstract.

18 Claims, 7 Drawing Sheets

LOCATION AUTHENTICATION

CROSS REFERENCE TO RELATED DOCUMENTS

This application is related to allowed U.S. Patent Publication 2005/0289585 which is hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

U.S. Patent Publication 2005/0289585 describes a TV system wherein the equalizer parameters and automatic gain control (AGC) gain settings for receiver amplifiers are used to characterize a particular television receiver installation. Once this installation is characterized, the system operator can use, for example, a set of equalizer parameters and/or amplifier gain settings to determine whether the receiver (e.g., a set top box) has been relocated so as to receive content in an unauthorized manner.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
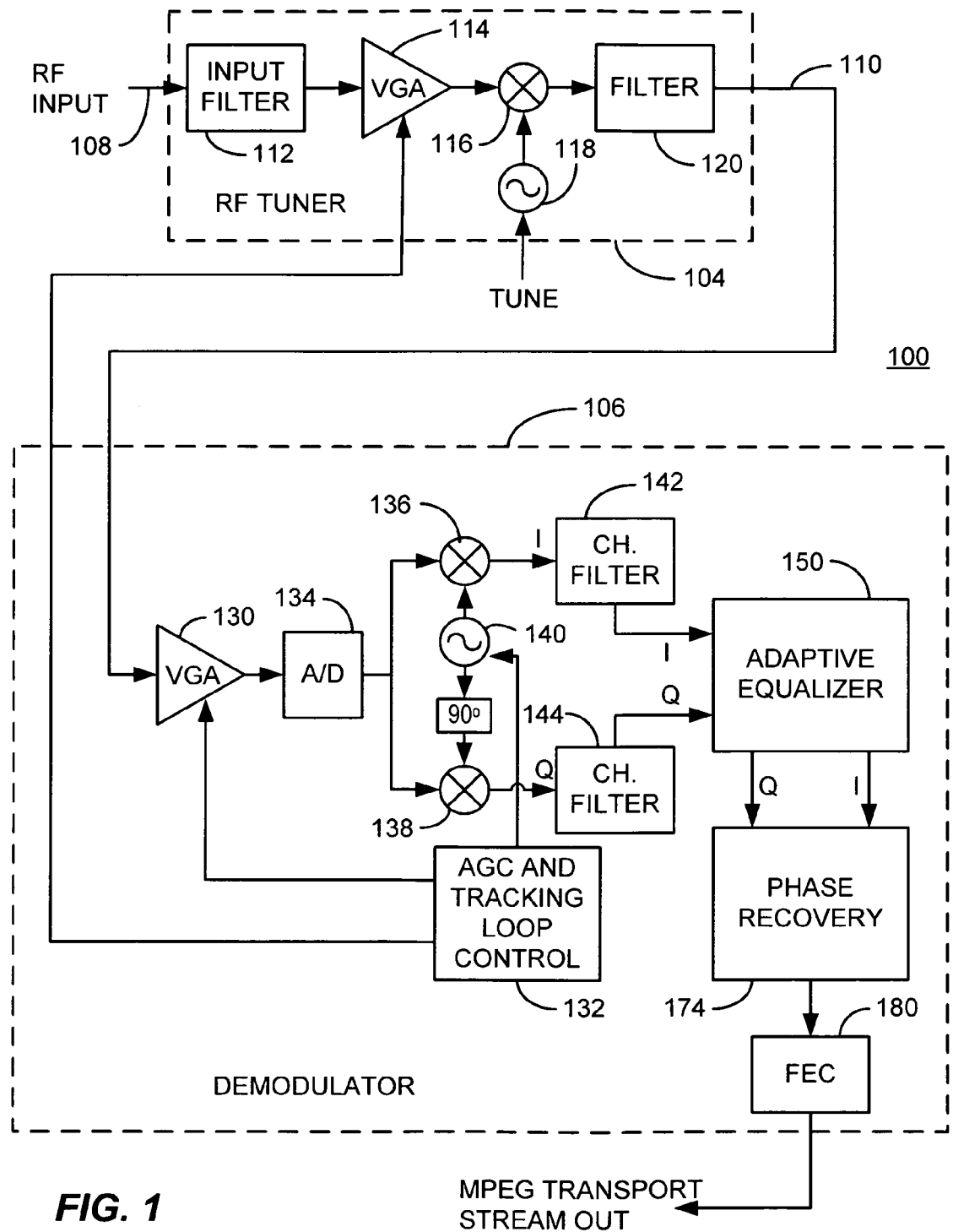
FIG. 1 is a block diagram of an exemplary RF network interface consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In the discussion below we will use the term "decryption key" as being synonymous with all three of the keys—periodic, program and content—as these may all be needed to properly decrypt content depending on the conditional access key hierarchy in use. Receiver addressed, unique Entitlement Management Messages (EMMs) typically deliver common periodic keys to at least a group of pay-TV receivers. The invention authenticates RF fingerprint information into the encrypted periodic key delivered with the EMM. Authentication in this instance means that the RF parameter information is cryptographically tied into to the encrypted periodic key. A TV receiver implementing this invention will need to cryptographically operate on the encrypted periodic key to ultimately calculate the clear periodic key. The periodic key is typically used to decrypt Entitlement Control Messages (ECMs) to calculate or derive the program key (if used) or the content key. The content key may be used directly to descramble content or may be used with a count value with the output used to descramble content.

Pay-TV service operators use conditional access to ensure the timely payment of subscription, pay-per-view and VOD fees. Conditional access security prevents hacking scenarios such as cloning and key redistribution. But one thing the pay-TV operators cannot easily defend against at this time is the misappropriation of signals. This is a situation that arises not from the hacking of the conditional access system, but rather the physical repositioning of a receiver from the intended location, typically the billing address of a home subscriber, to another location.

Operators often provide substantial discounts for a second and third receiver in a home after a subscriber pays a full subscription fee for the first receiver. But the subscriber can collude with others, e.g. friends, moving the second and third receivers to different homes. The service operator often cannot detect this occurrence. For example, the full subscription fee might be $70 with a charge of only $2.50 for each additional receiver within the same household. This can represent a substantial loss to the service operator—the full subscription fee, $70, to these other homes.

Satellite service operators often market premium, pay-per-view content and live event content. The signals often span an entire continent and encompass multiple countries. Content providers often wish to impose different access requirements across countries. Certain programs may be offered to viewers in the U.S. while not actually offered to those in Canada or Mexico. And for example, a "Wrestlemania" live event might be offered as a pay-per-view event in the U.S. while offered as high premium live multi-media presentation at taverns, concert halls and amphitheaters in Canada. It may be difficult for a service provider to prevent a receiver accessing the signal at a discounted rate in the U.S. from being moved to Canada (and used in a tavern, concert hall, or amphitheater). This would represent a large financial loss to promoters of the live event in Canada who would typically collect a fee proportional to the size of the different venues where it is being shown.

In addition, some sporting events are blacked-out in some jurisdictions—usually near the location of the event—to the consternation of subscribers, often in large metropolitan centers. Satellite service operators can't easily tell where a receiver is located and avid sports subscribers can provide an incorrect billing address, e.g. that of a friend, in order to avoid black-outs.

Satellite service operators can use telephone "caller ID" and service technicians to ostensibly verify the location of a receiver. This may be good for initial installation or re-initialization, but afterwards the phone line can be disconnected. Phone lines are often not located near TV receivers in subscriber homes, and may often be temporary, e.g. through the use of a phone extension cord. For various reasons, the service operators are not able to force the continued connection of the receiver to a phone line.

As previously noted, U.S. Patent Publication 2005/0289585, which is incorporated by reference, describes a TV system wherein the equalizer parameters and automatic gain control (AGC) gain settings for receiver amplifiers are used to characterize a particular television receiver installation. Such installation can be in the context of a cable, satellite or telephone company or Internet delivered television program.

Once this installation is characterized, the system operator can use, for example, the set of equalizer parameters and/or amplifier gains to determine whether the receiver (e.g., a set top box) has been relocated (so as to receive content in an unauthorized manner).

This system can be improved upon to provide an implicitly authentication arrangement wherein a television service operator can obtain the parameters associated with a particular installation (e.g., gain factors and/or equalizer coefficients or a portion thereof) and use such parameters to generate conditional access code words or decryption keys that are a function of the particular installation.

In many cases, a service provider must do a "truck roll"—get a service technician to a subscriber's home—in order to set-up service, bring the correct number of receivers, splitters, run coax, and connect TVs as needed. During installation, the technician, or home customer (if he or she already has access to receivers), can report certain equalizer parameters and/or amplifier gains to the authorization system by phone—at the headend or uplink. Alternatively, during the initialization process, it may also be possible to automatically query each receiver in the home for this information and report it back via a back-channel-phone or out-of-band channel.

In accord with this scenario, a conditional access (CA) system delivers periodic decryption keys (or other keys such as content decryption keys) which assume particular receiver parameters that are a function of the particular unique receiver installation. These parameters are not sent to the TV receiver. Hence, for example, the periodic key or other key may be cryptographically combined using, for example an XOR function with a receiver parameter specific to a particular installation. The receiver, (e.g., set-top box) can calculate the appropriate key by carrying out an inverse function (in this example also an XOR function) using the current parameter values if actively tuned to a channel (or alternatively, recently stored parameter values) on the received and encoded periodic key to retrieve the actual periodic key used by the decrypter. The periodic key may have other receiver values encoded into it as well for authentication, e.g. geographic location, tiers of service, available pay-per-view credit, etc. but these are not a subject of this disclosure. In another implementation, the receiver parameters or a portion thereof can be used as a key itself to decrypt the periodic key. If the set-top box does not have the proper equalizer coefficients or amplifier gains, e.g. because it was moved to a new installation site, then the set-top box will not decrypt the decryption key correctly. In this manner, the receiver's installation parameters are implicitly authenticated with the CA system's delivered keys that are already being delivering to the receiver.

The process is useful to prevent misappropriation of a signal (e.g., a copyrighted television program or event). By way of example, as explained in the above-referenced publication and in the background, it is difficult for a service provider to detect someone trying to cheat a service provider's policy regarding $2^{nd}$ and $3^{rd}$ receivers in home, black-outs and differences in marketing special events from one region or country and another. The invention detects that a set-top box has been moved, the equalizer and gain parameters changed and the set-top box no longer functions properly.

It does not matter that the TV receiver may be connected to a telephone line, and the service provider uses "caller ID" to determine whether the set-top box has changed locations. A customer may disconnect the phone line after installation, re-initialization or after the initial report back. And use of a back-channel, e.g. cable out-of-band, in some cases may not allow sufficient granularity of location. The location might be "narrowed down" to a cable node—a entire neighborhood of 500 or more homes.

By integration of this approach with CA mechanisms delivering a key, the scheme can also be used in 1-way systems. In this case, on initial set-up or re-initialization (discussed later) the parameters must be read and reported by the customer or installer technician to the headend or uplink for the service provider. After that, the system can operate 1-way only.

The present arrangement may provide a more streamline and possibly more secure way to use the technique without need for polling. It can be used in one-way only systems. It can be universally used over cable, satellite, Internet and telco television delivery systems. It is possible for a receiver to use multiple periodic keys delivered by different EMMs. Some of the EMMs may not require Radio Frequency (RF) fingerprint authentication while others can depending on the service and type of content being accessed. It should be noted that if a household only has one receiver, that it would not pose a threat for signal misappropriate of "sharing" a subscription with neighbors. Likewise, if a customer had one HD receiver and a couple of SD receivers, then that customer is not as likely to "share" the SD receivers. The service operator might not perceive a threat from those receivers and therefore not require RF fingerprint authentication.

Turning now to FIG. 1, an example system is depicted. While shown in the context of a cable system, it will be understood that similar technology can be used in other environments including satellite and telco systems.

The RF network interface 100 of FIG. 1 has two major sub-elements, the RF tuner 104 and the demodulator 106. Minor variations may exist in the modularity and functional elements of these major sub-elements. The function of the Radio Frequency (RF) tuner 104 is to receive all signals on the television system at its cable, satellite or other television signal input 108 and to exclude all but one desired RF channel, containing the digital service of interest at its output 110. An input filter 112 filters the input from the television system to eliminate noise and interfering signals. A low noise Variable Gain Amplifier (VGA) 114 boosts the signal from the filter 112 to apply the signal to mixer 116. The mixer 116 mixes the output of the amplifier 114 with a tunable oscillator signal from local oscillator 118. This process downconverts the entire block of incoming signals to a lower intermediate frequency (IF), with the signal of interest centered on a fixed, constant value. The output of the mixer 116 is filtered by IF filter 120 and provided to the demodulator 106, e.g. quadrature amplitude modulation (QAM). The 106 demodulator processes the tuner's IF output 110, converting it to an error free digital stream of, for example MPEG (Moving Pictures Expert Group), transport data, carrying the compressed audio and video services.

Inside the RF tuner the local oscillator 118, controlled by a host processor (not shown), varies in frequency such that the nonlinear combination of the local oscillator signal from 118 and the incoming spectrum from the television network or transmission medium (including atmospheric wireless transmission) inside the mixer 116 results in the signal of interest emerging from the mixer 116 centered at the fixed, lower Intermediate Frequency (IF). The IF might be selected to be a value such as 44 MHz.

The input filter 112 eliminates extraneous signals outside the range of valid audio/video services (e.g., 54 MHz to 863 MHz in many U.S. cable systems) and the variable gain amplifier (VGA) 114 is automatically adjusted at 132 so that the RF signals passing through the tuner and demodulator remain at optimum levels at all times. The final stage of the RF tuner is an output filter 120, such as for example a surface acoustic wave (SAW) filter 120, which is an electromechanical device designed to only let a small band of signals centered at the IF value pass through and all other RF energy to be heavily attenuated. The SAW filter 120 only passes a standard 6 MHz wide channel and effectively rejects all others. The signal that emerges from the tuner therefore is the channel carrying the service of interest and it has been downconverted to a fixed, standard (IF) frequency for processing by the QAM demodulator 106.

The demodulator 106, e.g. QAM, receives the incoming 6 MHz wide signal at the intermediate frequency, for example 44 MHz, and again amplifies it to a constant and optimum level through a second variable gain amplifier 130. The gain of VGA 130, as well as VGA 114, is automatically adjusted by one or more closed Automatic Gain Control (AGC) control loops within the QAM demodulator 106. The signal is then processed by an Analog to Digital Converter (A/D or ADC) 134, which converts the incoming stream of time-varying voltages to a serial stream of binary bits representing the voltages of the signal at discrete time intervals. The ADC 134 generally has 10 or more bits of resolution.

The digital stream from A/D 134 is then split into two components, the in-phase component (I) and the out-of-phase component (Q). The Q term is used because the signal is in quadrature with respect to the I signal, meaning it is shifted 90° in phase. Phase separation occurs simultaneously with down conversion to a baseband signal, where the lowest frequency is 0 Hz (DC) and highest frequency 6 MHz. This is in contrast to the incoming 44 MHz IF signal, which has its content symmetrically centered ±3 MHz about the IF signal. The downconversion is accomplished through the use of a balanced mixer (mixers 136 and 138) and the I-Q separation occurs because one of the two halves of the balanced mixer has a signal generated by local oscillator 140 that is shifted 90° in phase relative to the signal applied to the other half of the balanced mixer. The outputs of the balanced mixer, I & Q, are then passed through identical channel filters 142 and 144 that provide the appropriate shaping and attenuation of undesired processing artifacts occurring above the 6 MHz passband.

Figure 2A:
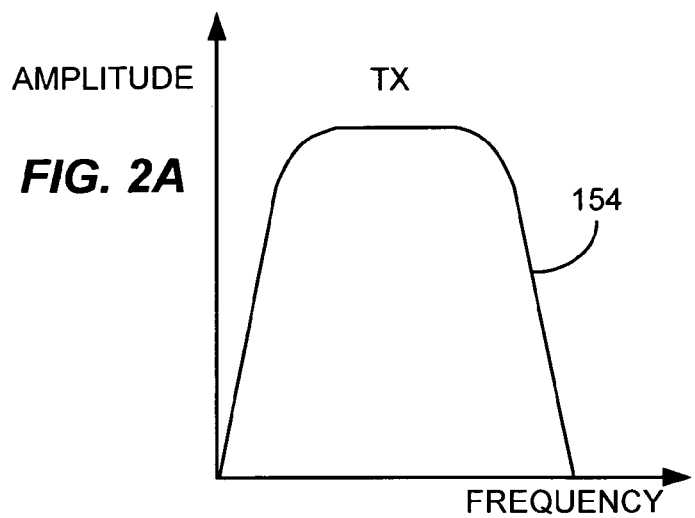
FIG. 2, which is made up of FIGS. 2A, 2B and 2C, are frequency domain graphs depicting equalization in a manner consistent with certain embodiments of the present invention.
Figure 2B:
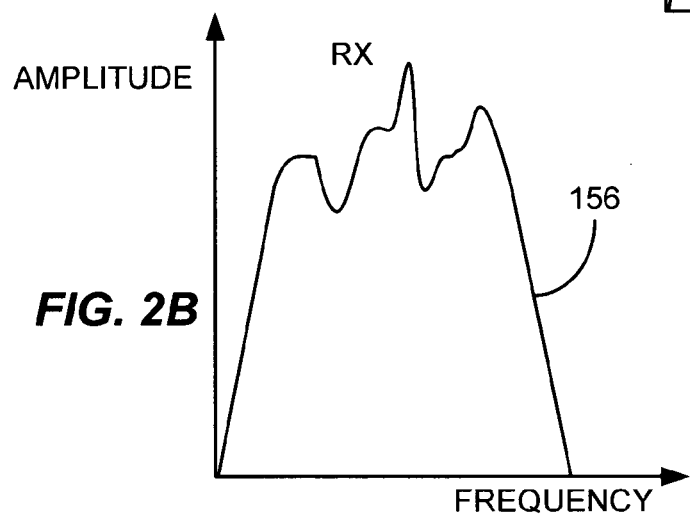
Figure 2C:
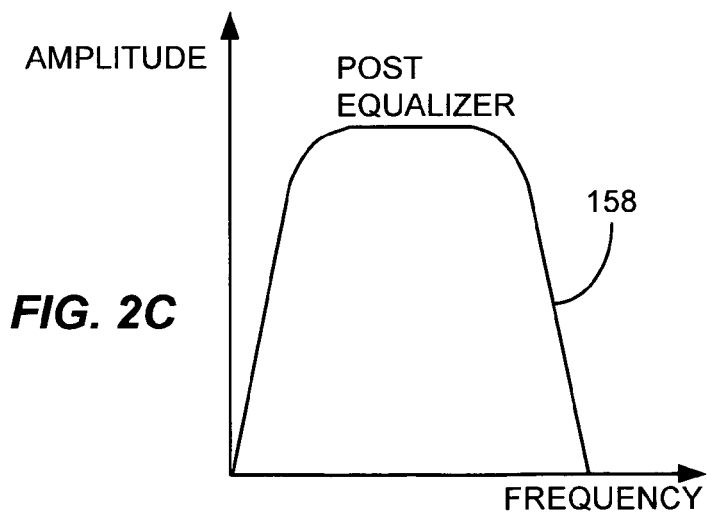

Next, an adaptive equalizer 150 is applied to the outputs of the channel filters 142 and 144. The adaptive equalizer 150 is an automatically self-varying digital filter network that continuously alters its filter characteristic (shape). Its purpose is to compensate automatically for echoes, reflections, dispersion, tilt, intersymbol interference and other distortions that alter the signal from its ideal, original form. Consider, for example, a signal having a transmitted spectrum 154 as shown in FIG. 2A. As this signal is carried by the cable operator's hybrid fiber-coax distribution network (or in the case of non-cable providers, by other transmission medium) to the receiving device various anomalies are introduced that may cause the spectrum to appear at the input of the receiver front end 100 as having a distorted spectrum such as the spectrum 156 shown in FIG. 2B. By approaching the ideal of a matched filter, distorted waveforms can be recovered and the error rates for transmitted data reaching the phase recovery element (derotator) significantly reduced. Thus, the job of the adaptive equalizer is to reconstruct the input signal so that its spectrum more closely approximates that of FIG. 2A, such as the spectrum 158 of FIG. 2C. This allows the system to operate successfully under non-ideal conditions, which are typical of real world applications. While the spectra depicted are amplitude spectra, those skilled in the art will appreciate that phase and frequency distortions may also occur and be corrected.

Figure 3:
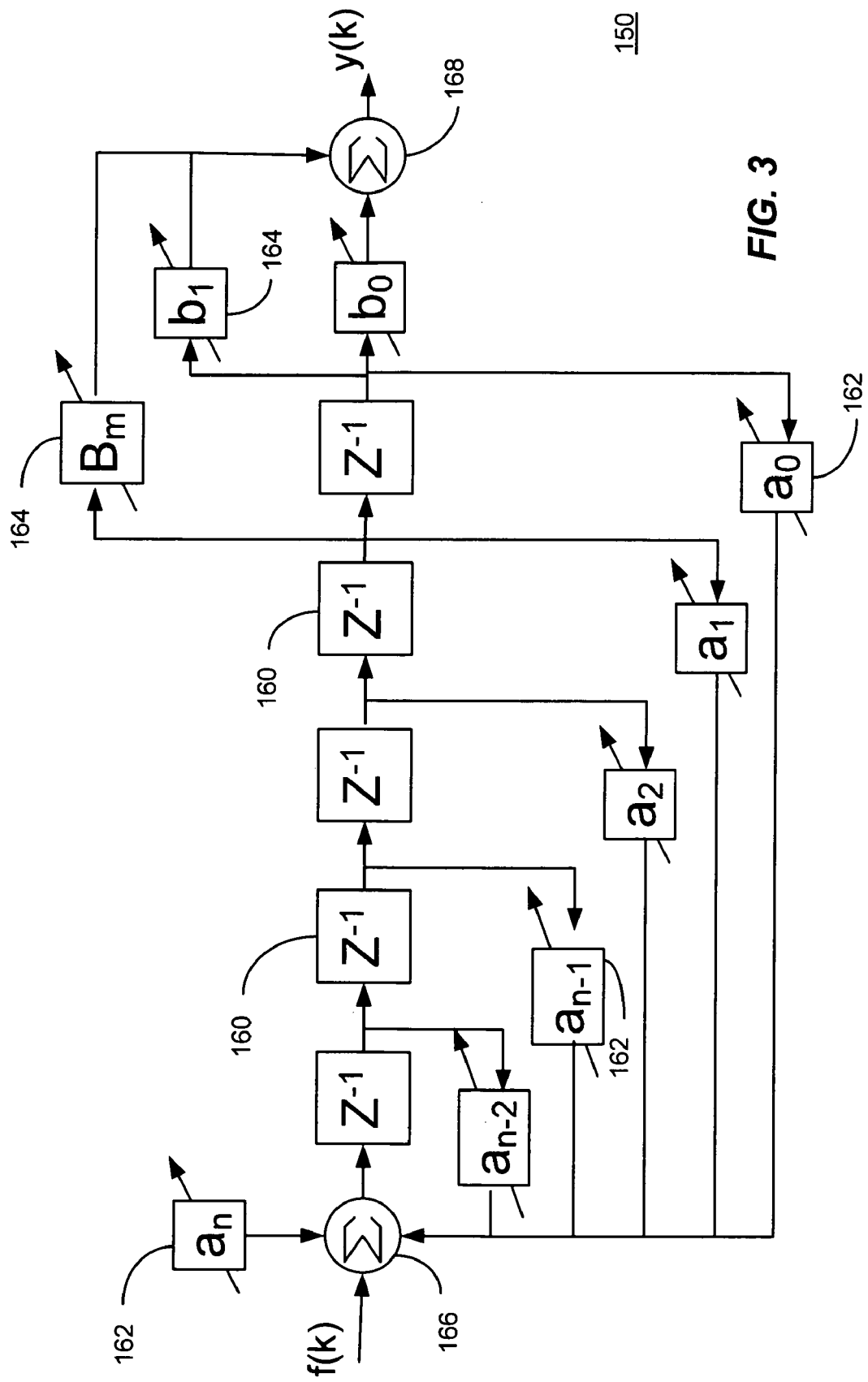
FIG. 3 is a block diagram of an exemplary equalizer consistent with certain embodiments of the present invention.

The details of how the adaptive equalizer 150 is realized differ between different QAM demodulator manufacturers. The general architecture is common between them and takes the form of a classic feed forward/feedback digital filter. A typical digital filter 150 for such a purpose is shown in FIG. 3.

The filter has a cascaded chain of delay stages ($Z^{-1}$) 160 where the discrete time samples of the voltages seen at the demodulator input, converted to binary digital form by the ADC are successively stored when applied to the input as signal sequence f(k). The output of each delay stage tap, in addition to feeding the next cascade, may be fed back to the input or fed forward to the output. The tap feedback may be may be in conjunction with feed forward and either path may be employed exclusively on a tap-by-tap basis. Each feedback or feed forward path has associated with it an independent coefficient term $a_0$ through $a_n$ such as 162 for the feedback tap values and 164 for the feed forward tap values $b_0$ through $b_n$. These tap values may provide amplification or attenuation of the tap output, depending upon the value of the coefficient which acts as a multiplier. The delayed values as modified by the feedback coefficients are added back into the signal chain at 166 and similarly, the values modified by the feed forward factors are added back into the signal chain at 168 to produce the output signal y(k). Variations of this arrangement are possible without departing from embodiments consistent with the present invention.

Because the equalizer 150 is adaptive, the coefficients dynamically change under the control of a microprocessor, controller or state machine. The values are varied based upon the characteristics of the equalizer output, as seen by the next processing stage, phase recovery. Adaptive equalizers in QAM demodulators vary in implementation between manufacturers. One design, for example, may have a total of 22 taps, where another may have a total of 40 taps—16 feed forward and 24 feedback. Many variations are possible without departing from embodiments consistent with the present invention.

The output of the adaptive equalizer 150 is then processed by the phase recovery block 174, also known as a detector or derotator. The purpose of the detector 174 is to decode the combination of I and Q signals into a single data stream. The detector is able to expand the incoming data streams by a factor of $\log_2$(Modulation Order). This expansion is a factor of 6 for 64-QAM and 8 for 256-QAM, the two typical forms transmitted in digital cable. This expansion is the reason high transport data rates can be efficiently carried in relatively low spectrum bandwidths that seem to violate the Nyquist criterion. The coefficient values 162 and 164 of the adaptive equalizer 150 and the frequency setting of the QAM modulator local oscillator are both controlled by a microprocessor or state machine based upon the success of the detector to "lock" i.e. to recover valid data.

The last processing stage, the forward error corrector (FEC) 180, applies any one or more of a variety of algorithms to the raw recovered digital cable data stream to reduce the likelihood that any of the data has been corrupted with errors in addition to formatting it appropriately for recovery of video and audio services as an MPEG transport stream. It is in this stage that Viterbi (trellis) decoding, de-randomization, Reed-Solomon error correction and MPEG formatting (or other digital formatting) may occur. Some overhead data unique to the operation of these stages are removed from the stream so that the final MPEG transport emerging from the demodulator is identical in form, content and data rate to what the cable operator inserted into the corresponding modulator at the headend for transmission.

Further processing is done to decrypt, demultiplex, decompress and convert the content to a form suitable for display on a television with accompanying audio playback. These functions, while vital to the proper function of the system, are out of context for this document and are conventionally carried out in later functional modules.

In accordance with certain embodiments consistent with the present invention, the ability to detect changes in location of a digital cable receiving device is based in part upon the adaptive equalizer. The equalizer, as indicated, acts as a matched filter to the communications channel, be it cable, satellite, telco, Internet or a line forming a part of the system such as a transmission line from a set-top box to a satellite dish. As a result, the values contained within the equalizer's coefficients can be mathematically manipulated to show the transfer function of the communications channel that influences signals passing through it. Stated differently, the values of the coefficients, taken as a set (e.g. a set of forty or so coefficient values or a subset or superset or fragment thereof), represent at a specific point in time the sum total knowledge of all mismatches, reflections, phase variations, gain variations, echoes and other perturbations of the transmission media upon the transmitted signal. The fact that the QAM demodulator is able to achieve and maintain signal lock under a given environment validates that the state of the equalizer at that time is such that it accurately reflects the knowledge of the television system's effect upon the system so it can negate those effects and lock successfully. The tolerance to a suboptimal equalizer configuration is generally low, given the small vector error radii for either QAM-64 or QAM-256 formats used in many digital television systems. The vector error radius is the composite of effects due to both amplitude and phase errors upon a received signal.

Since the filter coefficient set is directly representative of the transmission environment, it responds dynamically to any changes in that environment. Generally speaking, the low order feedback taps are most often and most significantly affected by high frequency trends, such as impedance variations at the connection or connector on the back of the appliance, reflections within the cable from the house splitter(s), etc. The middle taps are more predominantly affected by variations in the characteristics of the cabling to the tap and distribution amplifier, while the highest order taps are generally most sensitive to channel tilt, dispersion, etc. This data, when combined with the AGC information which indicates total gain required for a constant signal level input, and any other such parameters, provide the basis for a very characteristic fingerprint (FP) of the environment where a specific cable appliance is installed.

Tests have indicated that the equalizer is so sensitive to such changes that one can distinguish the cables coming from different ports of an RF splitter to a bank of attached digital cable appliances fed by a single common source. In an experimental case, the devices were all within one meter of each other and had identical cable lengths, yet the values observed for each device were unique and over time were relatively invariant.

If we let an equalizer coefficient be represented by a±jb, then $H_1$, the matrix of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients.

Likewise, if we let the gain value of one of the multiple AGC loops be represented by k, then $H_2$, the matrix of all AGC coefficients representing the state of the system at one point in time can be represented by:

$$H_2 = \begin{bmatrix} k_0 \\ k_1 \\ \ldots \\ k_l \end{bmatrix}$$

where l is the number of AGC coefficients.

If one were to capture the equalizer tap coefficients and AGC data from a digital cable appliance, applying a thresholding function based upon expected the statistical variance and then an algorithm to allow a weighted summation of the coefficients to a single scalar, a unary value representing the unique "fingerprint" of the environment of the device could be expressed. The threshold and weighting functions could be made unique to a particular operator and are secret to reduce the likelihood of tampering.

The algorithm for these operations then looks like:

Fingerprint(t)=F(t)=FP=Y($H_1,H_2$).

In one simple example, the fingerprint value can be, for example:

$$FP = F(t) = \sum_0^n a_n x_n + \sum_0^m b_m y_m + \sum_0^l k_l z_l$$

here the reference to t (time) is indicative that, although relatively time invariant, the various coefficients can in fact vary with time. In this simple example, all feedback coefficients are multiplied by a first set of constants ($x_n$), all feed forward coefficients are multiplied by a second set of constants ($y_m$) and all AGC coefficients are multiplied by a third set of constants ($z_l$). A substantial portion of the time variance can be removed by using only higher order coefficients or using only several of the most significant bits of the coefficients. For example, the first four, eight or twelve bits of a sixteen bit coefficient can be used so that a small change in the coefficient will not affect the fingerprint value. As part of the authentication process, the Entitlement Management Message (EMM) can signal how many of the bits of the coefficient were used in encoding the periodic key and the receiver will use those to recover the key. If there are 40 coefficients, and the four most significant bits are used, this results in a 160 bit code value that can substantially uniquely characterize the installation for purposes of this application. In other embodiments, other fragments of the coefficients could be used, such as for example, bits five through twelve of a sixteen bit coefficient (bit one being most significant) of only the odd numbered taps would similarly produce a stable 160 bit code value. Note that the 160 bit example is not to be considered limiting, but merely illustrates multiple ways to achieve a desired size code word.

This fingerprint value is gathered, evaluated and stored at the service provider's control system at the broadcast center—headend or uplink. An alternate embodiment stores the fingerprint value in the digital television receiver appliance memory upon receipt of a command message triggered at the time of installation or by an operator resetting a customer's installation fingerprint (after maybe talking to that customer over the phone). A service provider may wish to re-initialize a fingerprint after the customer signs up for some type of premium content. At that time, the customer can be asked to connect the receiver to a phone-line.

In certain other embodiments, the fingerprint value can be a matrix or set of values (rather than a single value) containing all or part of the values of the equalizer coefficients and all gain values, however, this should not be considered limiting, since other algorithms can also be defined. For example, by adjusting the coefficients so that some of them equal zero, a subset of the equalizer coefficients and some all or none of the gain values could be used. Additional characteristic data can also be used. Similarly, these functions can be mathematically combined as discussed above to produce a more compact fingerprint if desired.

It is noted that the equalizer coefficients and gain values are generally adaptive in order to deal with minor but normal variations in the transmission system's parameters as a result of aging components and transmission media, weather conditions, minor relocation of wiring, etc. which would occur without being an indication that the receiver has been significantly relocated. As a result, any fingerprint taken at a particular time may vary somewhat as the equalizer adapts to minor changes. As a result, the higher order bits and higher order equalizer coefficients are most stable for use in accord with the present teachings. Alternatively, the most significant bits of some or all of the parameters can be used.

Figure 4:
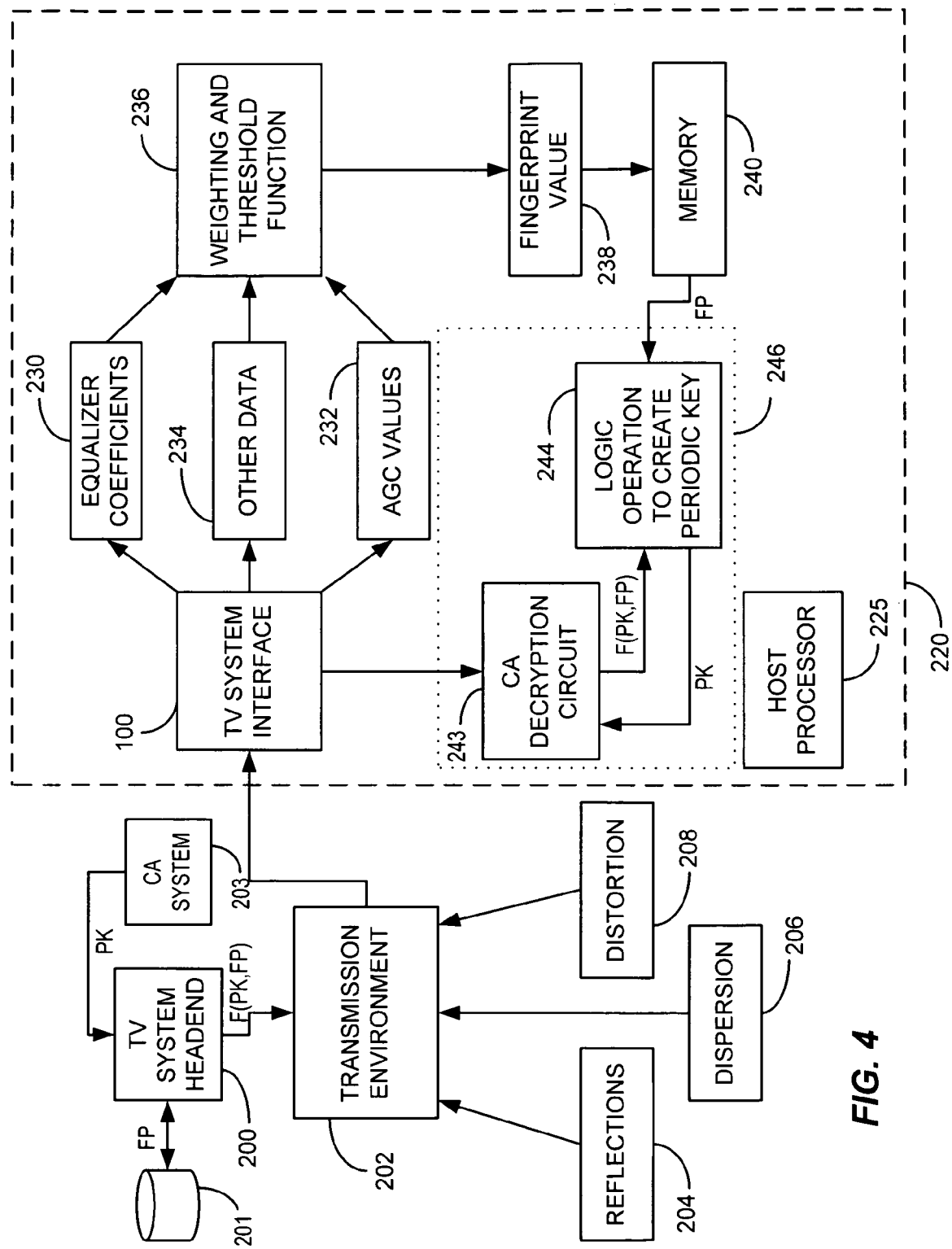
FIG. 4 is a block diagram of a RF network consistent with certain embodiments of the present invention.

FIG. 4 depicts an exemplary environment for a network device utilizing certain embodiments consistent with the present invention. In this system, the television signal originates at the cable plant headend 200. The headend 200 maintains a database 201 of fingerprint values (FP) for the various receiver devices in the system and includes a conditional access (CA) system 203 used to encrypt content using various keys including content keys and periodic keys (PK). The present system will assume that the PK is to be processed, but this is not to be limiting since any CA related decryption key could be used. The signal passes through the high frequency cable transmission environment 202 (e.g., a hybrid fiber-coax—HFC—system or satellite system) or other television transmission system where various reflections 204, dispersions 206 and distortions 208 and other factors are introduced into the transmitted signal to corrupt the transmitted signal prior to delivery to the network device 220 at the television system interface 100 as previously described. The network device 220 incorporates a host processor 225 such as a microprocessor that operates according to a stored set of programmed steps to carry out the functions described hereafter as well as conventional functions of such a host processor.

In order to carry out a fingerprinting operation consistent with certain embodiments, equalizer coefficients 230, possibly along with AGC gain values 232 and possibly other data 234, are applied to a weighting and threshold function 236 to produce a fingerprint value or collection of values FP at 238. This value (or these values) is stored in memory 240 and is used in conjunction with the CA system to determine whether a receiver 220 is authorized or not. In this implementation, the memory 240 contains the fingerprint value FP (which is also stored at the headend 200 and is combined using any suitable logic with one or more of the decryption keys to produce a value F(PK,FP) which is sent to the receiver 220.

However, memory 240 may not be required as the receiver could determine the fingerprint as needed while processing the periodic key. The CA decryption circuit 243 and the logic operation to create the periodic key 244 can be carried out in cryptographic processor 246. The cryptographic processor 246 may be part of larger IC such as the decoder IC (not shown). Ideally, the periodic key would not leave the security confines of the cryptographic process 246. Some system on chip (SOC) implementations may include tuning circuits as well as the cryptographic processor 246. And in this situation it may be possible for the fingerprint value to be determined within the SOC. For instance, the cryptographic processor 246 might be able to directly access the registers containing the AGC values, Equalizer coefficients, and other data using internal buses within the SOC. Alternatively, the cryptographic process 246 can be given those values. And in this way, the algorithm for determining the fingerprint value, the weighting and threshold function 236, could be kept secret. The weighting and threshold function 236 could be inside the cryptographic processor 246. The CA decryption circuit 243 receives F(PK,FP) and passes this to a logic operator (which may form a part of host processor 225 or be a part of CA decryption circuit 243 or the cryptographic processor 246) where the value F(PK,FP) is processed to create the value PK, for example, which represents the periodic key used by the CA decryption circuit as a part of the CA decryption process. It should be noted that the CA decryption circuit 243 can encompass a number of proprietary authentication and processing stages. The fingerprint value 238 can be used in any of the periodic key processing stages so long as ultimately the correct periodic key can be calculated. In other words, the fingerprint value does not need to operate on the periodic key itself. It could operate on a pre-key. But for simplicity of the discussion below, the fingerprint is described operating on the periodic key PK itself.

Hence, in this process (assuming it is the periodic key PK that is to be processed), this key is processed by combining the key with a fingerprint FP from the receiver 220 to produce a function F(PK,FP) which embeds an unique or semi-unique identifier of the receiver 220 with the key PK. One simple example is use of an XOR function as follows. At the transmitter side F(PK,FP) is created as:

$$F(PK,FP)=XOR(PK,FP)$$

And at the receiver side, the value of PK is recreated by:

$$PK=XOR(F(PK,FP),PK)$$

This permits the receiver to retrieve the periodic key (or any other key used by the receiver device 220) using a formula that is specific to the receiver installation for receiver 220.

Since the AGC circuit gains and the equalizer coefficients are subject to changing as the system adapts to weather, cable movements and the like, the value of the FP should preferably be selected to be a value that is not prone to substantial changes. This can be accomplished, for example, by using only the most significant bits of several or all of the equalizer and gain parameters so that the equalizer and amplifier gains can have some freedom to react to changes in transmission characteristics while still permitting the use of these parameters as a suitable FP value that can be reliably combined with the key.

The receiver may be able to detect a change in installation on its own if it keeps a stored fingerprint value. A change in the RF parameters would cause the receiver to calculate an incorrect periodic key PK. The change could be the result of moving the receiver from one room of a home to another and possibly new coaxial cable was strung with a splitter. It may be possible to query the customer to hook-up the phone line to the receiver in order to allow "caller ID" to automatically fix the location of the receiver and to re-initialize the fingerprint stored at the authorization center. This could be done in a way as to not require a live operator. Alternatively, the customer can talk to a live operator, and tell them to "re-initialize" the receiver. And this would cause the consumer to read values from the screen to the operator, or the receiver would need to be hooked up to the phone line to get that information.

Figure 5:
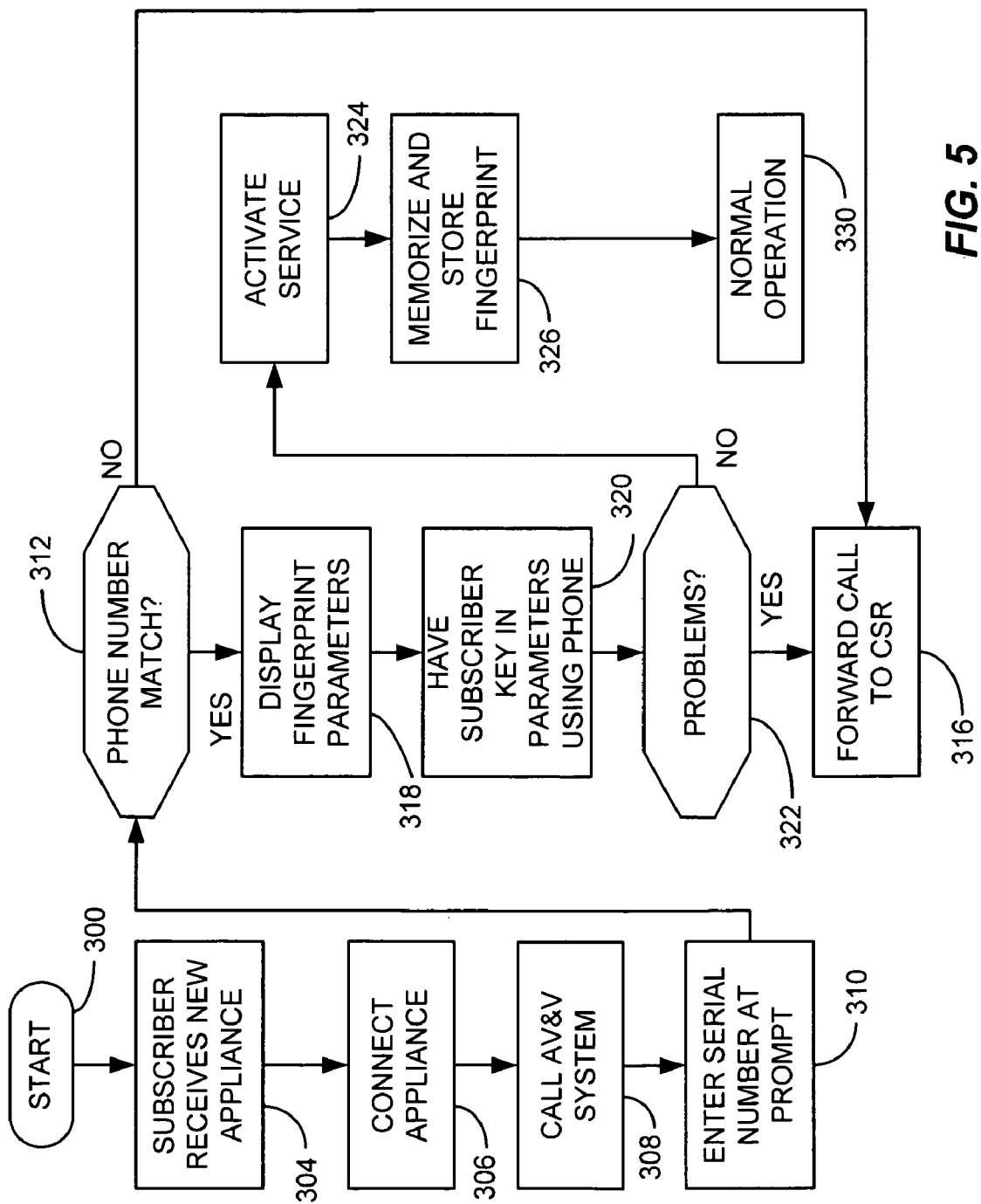
FIG. 5 is a flow chart of an exemplary activation process consistent with certain embodiments of the present invention.
Figure 6:
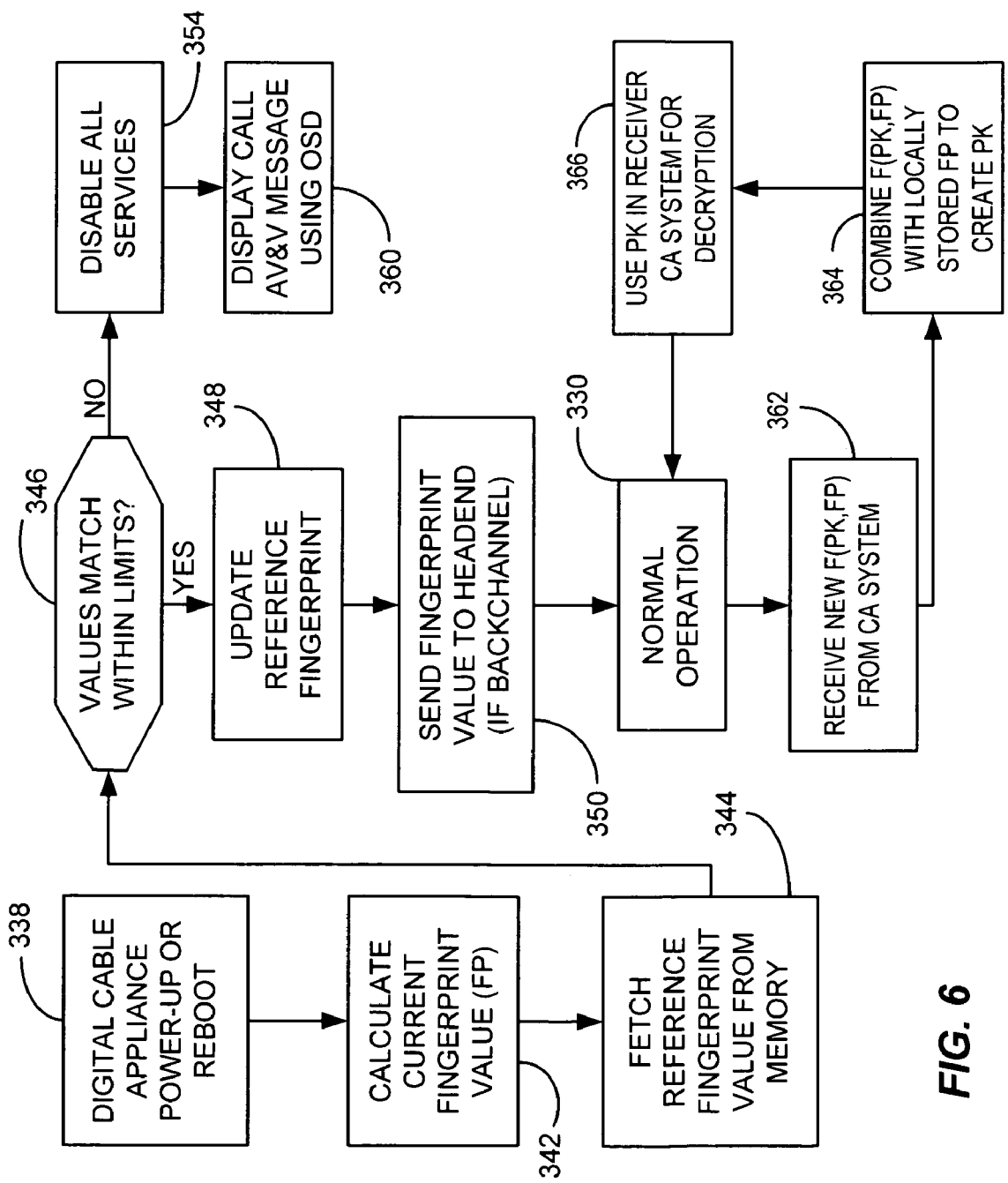
FIG. 6 is a flow chart of an exemplary fingerprint matching process consistent with certain embodiments of the present invention.

One exemplary, but non-limiting, practical embodiment of a system and method employing RF fingerprinting is depicted in FIG. 5 and FIG. 6 as follows:

The following discussion assumes a scenario where the receiver does not have a phone connection. Rather the customer is asked to key in values displayed on screen. In a scenario with a phone connection to the receiver, some of the steps could be automated. Starting at 300, a subscriber receives a fingerprint system equipped appliance from the service operator, cable, satellite or telco or the subscriber has significantly chanced the installation of an existing appliance at 304. The product displays an On-screen Display (OSD) or contains labeling indicating "Call XXX-XXX-XXXX from your home phone after connecting the device to the network and television for activation". This can be identical in concept to one of the processes followed for activation of home satellite television receivers and credit or Automated Teller Machine (ATM) cards issued through mail by the major financial institutions.

The subscriber follows the instructions connects the appliance at 306 and calls the number on the appliance label after installation at 308, as indicated. An automated validation and verification (AV&V) system at the cable operator receives the call and prompts the subscriber to enter the serial number of the cable appliance at 310 using the keypad on the telephone and may ask the subscriber to press the "#" key upon completion.

Upon receiving the "#" key input or upon other indication that the data entry is complete, the AV&V system confirms the validity of the entered appliance serial number. The system then looks through its subscriber database and finds the record for the subscriber issued the appliance with the entered serial number. It then reads the subscriber's home phone number from the database record. Using ANI, a non-maskable form of caller identification used for calls to toll-free telephone numbers (and 911 calls), the AV&V system then compares the phone numbers at 312 confirms a match between the incoming call and the number of record. If there is no match, the AV&V system refers the call to a customer service representative (CSR) at 316 to resolve any problems. This step validates that an authorized subscriber is attempting to activate the appliance issued to them by the service operator.

If the ANI and phone number of record match at 312, the AV&V system then sends, via the cable network, an Entitlement Management Message (EMM) command to the appliance having the serial number the subscriber entered by phone. This EMM commands the appliance to display, on the subscriber's television screen, the RF fingerprint at sequence at 318 contained. The AV&V system then instructs the subscriber to enter into the telephone, the number displayed on the screen using the keypad on the telephone and to press the "#" key upon completion at 320.

Upon receiving the "#" key input, the AV&V system records the RF fingerprint entered. A number of check digits may be used to ensure proper entry by the customer. If unsuccessful at 322, refers the call to a customer service agent at 316. This step validates that the authorized subscriber is attempting to activate or re-initialize the appliance issued to them by the service operator at the home of record.

If the RF Fingerprint is input correctly at 322, the AV&V system records that value and sends another EMM to the now validated appliance, commanding it to perform two steps:

Activate the services authorized for that subscriber at 324, and

Calculate the RF fingerprint for the appliance at the present location and store it in persistent memory at 326. Normal operation of the appliance now proceeds at 330.

With reference to FIG. 6, when directed by the headend or by virtue of a system reboot at 338, the receiver collects data from the gain circuits and equalizer circuits and calculates an electronic fingerprint value at 342. This value can, in certain implementations be compared to a reference value stored in memory by fetching that value at 344. If the calculated value of FP is within predetermined limits of the reference value, then the reference fingerprint value may, in certain embodiments, be updated at 348. This would generally occur if the new value for the fingerprint is sufficiently different from the stored reference value, but sufficiently close for confidence that the installation has not been substantially altered (e.g., by a move to a new location), then the reference value in memory can be updated with the new reference value at 348 and the fingerprint value can be sent to the service operator's control system if a back-channel is available (cable out-of-band return channel or phone).

Consider the situation of a reboot or power-up. Whenever the appliance is rebooted or otherwise reset, signifying a lapse in network connectivity where the appliance may have been relocated without the authorization of the television service provider, the appliance collects data and calculates an electronic fingerprint value at 342. The reference fingerprint is then retrieved from memory at 344 and these values are compared at 346. If the calculated value is within predetermined limits, the new value may be placed in memory at 348 as the updated reference fingerprint. The cable network device continues the booting process (if necessary) at 350 and services are restored with normal operation at 330. If the match is unsuccessful at 346, all television services can be automatically self-de-authorized (disabled, turned off or inhibited) at 354 by the receiver appliance itself. That is, the receiver appliance, by whatever means, does not produce television signals as an output thereof. This can be accomplished by any number of mechanisms including hardware and software disabling techniques (bypassing functional algorithms, disabling power, disrupting a signal flow, substitution of values for signal, gain, frequency, flag or coefficient values, parameters, etc.) An on-screen message can then be generated by the appliance at 360 (as described in FIG. 5) and displayed on the subscriber's television screen indicating that the cable operator must be contacted at the AV&V telephone number contained within the message for appliance reactivation. This message occurs because the appliance has determined that an unauthorized relocation has occurred. When the subscriber calls the displayed telephone number, the AV&V process is started anew and the location of the device is re-evaluated.

As indicated in FIG. 6, once normal operation is attained at 330, a new value of any suitable decryption key used in the receiving process can be received at 362 in a form that has been modified at the headend by making any reversible modification using the receiver parameters to produce the function F(PK,FP). This value F(PK,FP) can then be combined locally at the receiver at 364 with the stored or re-acquired value of FP in order to retrieve PK for use at 366 in the receiver's CA system to decrypt other keys or content as desired to produce normal operation of the receiver appliance.

Hence, in each case the value of one or more decryption keys used for decryption at the receiver device can be modified by a characteristic of the receiver device's installation. This characteristic constitutes a fingerprint of the receiver device in its particular installation. By use of a reversible function, the receiver device is able to recreate the CA decryption key based on a value that is specific to a particular installation of that receiver device.

Figure 7:
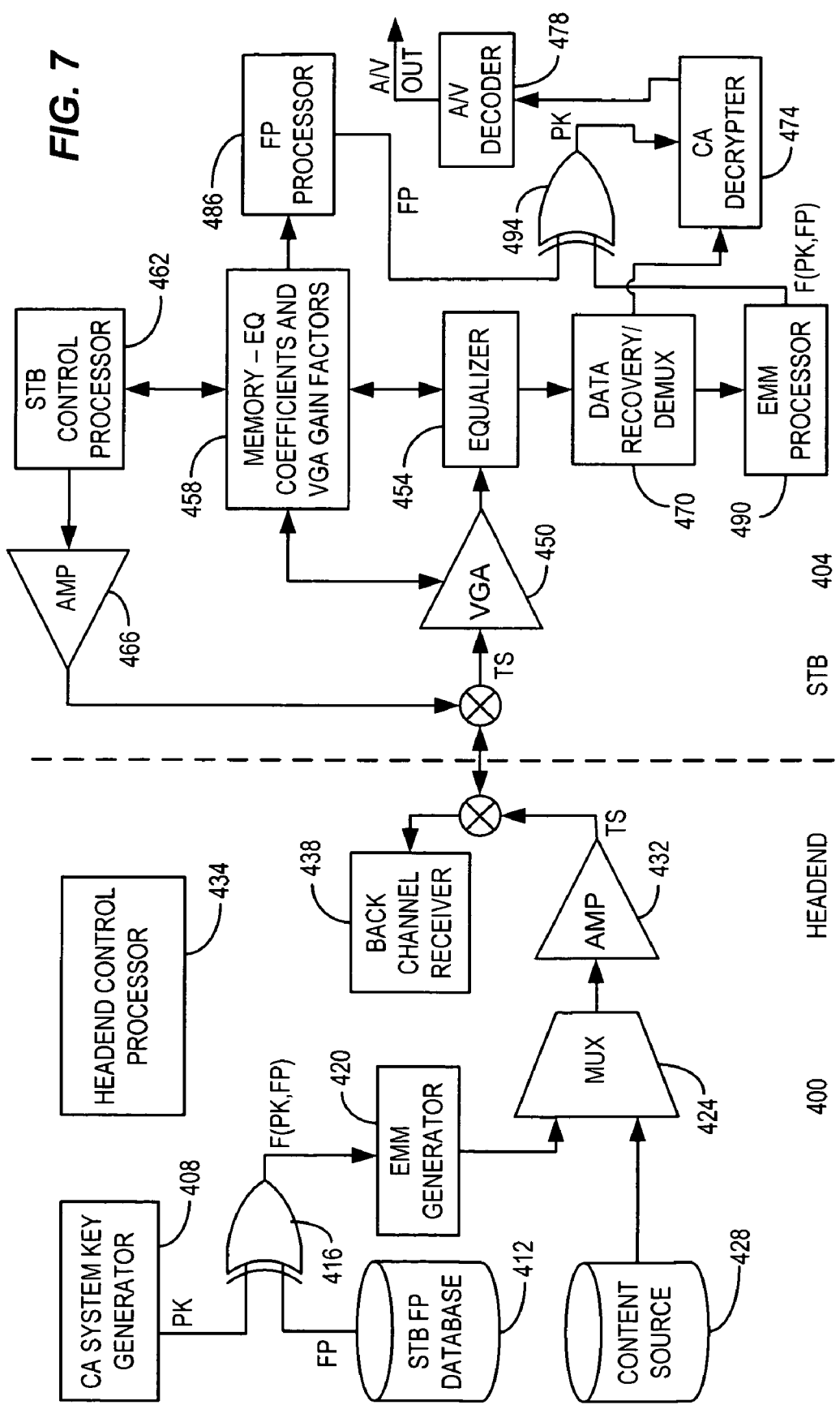
FIG. 7 is an illustration depicting an example system's treatment of a periodic key in a manner consistent with certain embodiments of the present invention.

With reference to FIG. 7, a simplified example system that uses an XOR as a logic function for combining the PK and FP is depicted. However, it should be noted that any logic operation that combines PK and FP at the headend 400 in a manner that is reversible at the receiver (e.g., STB) 404 can be used in place of the XOR function. Additionally, the actual algorithm for generation of FP can be varied (e.g., by selection of differing parameters and changing the parameters used in the FP) to further thwart abuse of the network by those who wish to receive content without paying for it.

At the headend 400, a CA system key generator 408 generates a multitude of keys used either for encryption of other keys or encryption of content. In this non-limiting example, the periodic key PK is generated in a conventional manner, but is combined using an XOR function with the fingerprint FP retrieved from a database 412 containing FP data for each receiver in the system at XOR function 416. This produces an output which is PK XORed with FP which equals the function F(PK,FP). This function is fed to the EMM generator 420 that embeds the function F(PK,FP) into an entitlement management message (EMM). This EMM is multiplexed at the multiplexer 424 with other packets of content from one or more content sources 428 to produce an output transport stream. This transport stream (TS) is amplified at amplifier 432 for transmission over the any suitable transport medium (satellite transport, cable, telephone or Internet) to the receiver side 404. All of these operations are carried out under control of one or more headend control processors 434, which generally oversees and controls operation of all components. In order to effect storage of the appropriate FP for each receiver, the headend is supplied this data either by a technician (for example in the case of a one way system—but not limited thereto) at the time of installation, or via a back channel. In the latter case, the back channel data are received via a back channel receiver 438 and passed to the database 412, e.g., by the processor 434.

At the receiver side 404, the transport stream TS is received and processed by a variable gain amplifier 450 and an equalizer 454. As previously noted, these components adapt to the characteristics of the transmission channel to compensate for attenuation, frequency, phase and noise distortions and operate using variable gain factor coefficients for the amplifier (or amplifiers) 450 and equalizer coefficients for equalizer 454. Such equalizer coefficients and gain factors are stored in a memory 458. These gain factors and equalizer coefficients can be sent, in a two way system as depicted in this example, via the STB control processor 462 back to the headend via a back channel using a modem or the like incorporating an amplifier 466.

It should be noted that the control processor 462 can transmit the coefficients and gain factors, the fingerprint, or encrypted versions of either without limitation. If the coefficients and gain factors or a representation thereof are transmitted, then the headend 400 should be provisioned with a suitable FP processing capability in order to generate the FP value from the data received.

Once the TS has been amplified and equalized at 450 and 454 respectively, the TS data are recovered and demultiplexed at data recovery and demultiplexer circuitry 470. In this simplified illustration, the data representing the content that is tuned are sent to a CA decrypter 474 for decryption before being forwarded to audio and video decoders 478 to produce the audio and video output signal for consumption by the subscriber.

In order to accomplish the decryption at 474, however, the CA decrypter 474 needs to have the appropriate decryption key PK. In this example, the decryption key PK is a periodic key which is used to decrypt rapidly changing content keys transmitted via entitlement control messages (ECMs), but in other embodiments, the content keys could be processed in this manner without departing from implementations consistent with the present invention. To accomplish this, the coefficients and/or gain factors (depending upon how the FP is to be crafted) are supplied to a FP processor 486 (which may be a process running on control processor 462. The function F(PK,FP) is recovered from the EMM message via EMM processor 490 and the function is XORed at 494 with the FP value from 486 to recover the value of the periodic key PK. This PK is then supplied to the CA decrypter thereby provisioning the decrypter 474 to decrypt content keys from the ECM messages and thereby decrypt the encrypted content.

It will be appreciated by those skilled in the art, upon consideration of the present teachings that the system depicted in FIG. 7 is by necessity simplified for purposes of teaching and that real world systems include numerous components and functional systems that are omitted for clarity. It will also be appreciated that many variations are possible including variations in the makeup of the fingerprint such as using only alternate coefficients or some other subset of coefficients or gain factors, using only a specified number of the most significant bits of certain coefficients or gain factors, the specific arrangement of the gain factors and coefficients, variation of the way the gain factors and coefficients are arranged from time to time, variation in the function used to combine the gain factors and coefficients, etc. Such variations are contemplated by the present teachings.

Thus, in accord with certain implementations, a method of authenticating the installation of a television receiver involves generating a fingerprint value, wherein the fingerprint value is function of the television network characteristics at an authorized installation location, and wherein the fingerprint is a function of at least one of a gain value of a variable gain amplifier and an equalizer coefficient of an adaptive equalizer of the television appliance; receiving a code that is a function of both a decryption key and the fingerprint value from a broadcast source; ascertaining a value of the decryption key by applying an inverse function to the code that produces the decryption key as an output; and carrying out a decryption process at the television receiver appliance using the decryption key.

In certain implementations, the decryption key inverse function, and resulting decryption key are kept within a security perimeter immune from eavesdropping. In certain implementations, the fingerprint is a function of equalizer coefficients and gain values of an adaptive equalizer and variable gain amplifiers of the television appliance, and wherein the most significant bits of an equalizer coefficient is represented by a±jb, then $H_1$, the matrix of the most significant bits of all equalizer coefficients representing the state of the system at one point in time can be represented by:

$$H_1 = \begin{bmatrix} a_0 & b_0 \\ a_1 & b_1 \\ \cdots & \cdots \\ a_n & b_m \end{bmatrix}$$

where n is the number of feedback coefficients and m is the number of feed forward coefficients; and the most significant bits of a gain value of at least one of a plurality of variable gain amplifiers is given by k, then $H_2$, the matrix of all gain values representing the state of the system at one point in time can be represented by:

$$H_2 = \begin{bmatrix} k_0 \\ k_1 \\ \cdots \\ k_l \end{bmatrix}$$

where l is the number of gain coefficients; and the fingerprint is given by FP=Y($H_1$,$H_2$).

In certain implementations the fingerprint includes a plurality of the most significant bits of equalizer coefficients of an adaptive equalizer of the television receiver appliance. In certain implementations, the fingerprint comprises a plurality of the most significant bits of gain coefficient values of a variable gain amplifier of the television receiver appliance. In certain implementations, the fingerprint comprises a function of at least one gain coefficient value of an AGC loop of the television appliance. In certain implementations, the fingerprint comprises a weighting function of at least one of the following: at least one equalizer coefficient of an adaptive equalizer of the television appliance and at least one gain coefficient value of an AGC loop of the television appliance. In certain implementations, the weighting function is kept inside a security perimeter immune from eavesdropping. In certain implementations, the fingerprint value is combined with the decryption key using an exclusive OR operation to produce the code.

An exemplary method of transmitting a decryption key from a television service provider broadcast station to a television receiver involves ascertaining a fingerprint of the television receiver appliance, such fingerprint comprising a function of at least one of an equalizer coefficient and an amplifier gain at an installation site of the television receiver appliance; cryptographically combining a decryption key with the fingerprint to produce a code; and transmitting the code to the television receiver appliance.

In certain implementations, the fingerprint is a function of equalizer coefficients and gain values of an adaptive equalizer and variable gain amplifiers of the television appliance, and wherein an equalizer coefficient is represented by a±jb, then $H_1$, the matrix of the most significant bits of all equalizer coefficients representing the state of the system at one point in time can be represented by:

$$H_1 = \begin{bmatrix} a_0 & b_0 \\ a_1 & b_1 \\ \cdots & \cdots \\ a_n & b_m \end{bmatrix}$$

where n is the number of feedback coefficients and m is the number of feed forward coefficients; and the gain value of one of a plurality of variable gain amplifiers is given by k, then $H_2$, the matrix of at least the most significant bits of all gain values representing the state of the system at one point in time can be represented by:

$$H_2 = \begin{bmatrix} k_0 \\ k_1 \\ ... \\ k_l \end{bmatrix}$$

where l is the number of AGC coefficients; and the fingerprint is given by $FP=Y(H_1,H_2)$. Any of the methods described can be implemented by use of one or more programmed processors execution instructions stored in a computer readable storage medium.

An exemplary implicitly authenticating television receiver appliance involves a fingerprint generator that generates a fingerprint value, wherein the fingerprint value is function of the television network characteristics at an authorized installation location, and wherein the fingerprint is a function of at least one of a gain value of a variable gain amplifier and an equalizer coefficient of an adaptive equalizer of the television appliance; a processor that performs a decryption function using the fingerprint value on a code received from a television transmission service headend to produce a decryption key; and a decrypter that decrypts information using the decryption key.

In certain implementations, the fingerprint is a function of at least the most significant bits of equalizer coefficients and gain values of an adaptive equalizer and variable gain amplifiers of the television appliance, and wherein an equalizer coefficient is represented by $a\pm jb$, then $H_1$, the matrix of all equalizer coefficients representing the state of the system at one point in time can be represented by:

$$H_1 = \begin{bmatrix} a_0 & b_0 \\ a_1 & b_1 \\ ... & ... \\ a_n & b_m \end{bmatrix}$$

where n is the number of feedback coefficients and m is the number of feed forward coefficients; and the gain value of one of a plurality of variable gain amplifiers is given by k, then $H_2$, the matrix of all gain values representing the state of the system at one point in time can be represented by:

$$H_2 = \begin{bmatrix} k_0 \\ k_1 \\ ... \\ k_l \end{bmatrix}$$

where l is the number of AGC coefficients; and the fingerprint is given by $FP=Y(H_1,H_2)$.

In certain implementations, the fingerprint comprises equalizer coefficients of an adaptive equalizer of the television appliance. In certain implementations, the fingerprint comprises gain coefficient values of a variable gain amplifier of the television appliance. In certain implementations, the fingerprint comprises a function of at least one gain coefficient value of an AGC loop of the television appliance. In certain implementations, the fingerprint comprises a weighted function of at least one of the following: at least one equalizer coefficient or a portion thereof of an adaptive equalizer of the television appliance and at least one gain coefficient value or a portion thereof of an AGC loop of the television appliance.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of authenticating the installation of a television receiver, comprising:
   generating a fingerprint value, wherein the fingerprint value is a function of the television network characteristics at an authorized installation location, and wherein the fingerprint is a function of at least one of a gain value of a variable gain amplifier and an equalizer coefficient of an adaptive equalizer of the television appliance;
   receiving a code that is a function of both a decryption key and the fingerprint value from a broadcast source, where the fingerprint value is combined with the decryption key using an exclusive OR operation to produce the code;
   ascertaining a value of the decryption key by applying an inverse function to the code that produces the decryption key as an output; and
   carrying out a decryption process at the television receiver appliance using the decryption key.

2. The method according to claim 1, wherein the decryption key inverse function, and resulting decryption key are kept within a security perimeter immune from eavesdropping.

3. The method according to claim 1, wherein the fingerprint is a function of equalizer coefficients and gain values of an adaptive equalizer and variable gain amplifiers of the television appliance, and wherein the most significant bits of an equalizer coefficient is represented by $a \pm jb$, then $H_1$, the matrix of the most significant bits of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients; and
   the most significant bits of a gain value of at least one of a plurality of variable gain amplifiers is given by k, then $H_2$, the matrix of all gain values representing the state of the system at one point in time can be represented by:

$$H_2 = \begin{bmatrix} k_0 \\ k_1 \\ \ldots \\ k_l \end{bmatrix}$$

where l is the number of gain coefficients; and
   wherein the fingerprint is given by $FP = Y(H_1, H_2)$.

4. The method according to claim 1, wherein the fingerprint comprises a plurality of the most significant bits of equalizer coefficients of an adaptive equalizer of the television receiver appliance.

5. The method according to claim 1, wherein the fingerprint comprises a plurality of the most significant bits of gain coefficient values of a variable gain amplifier of the television receiver appliance.

6. The method according to claim 1, wherein the fingerprint comprises a function of at least one gain coefficient value of an AGC loop of the television appliance.

7. The method according to claim 1, wherein the fingerprint comprises a weighting function of at least one of the following: at least one equalizer coefficient of an adaptive equalizer of the television appliance and at least one gain coefficient value of an AGC loop of the television appliance.

8. The method according to claim 7, wherein the weighting function is kept inside a security perimeter immune from eavesdropping.

9. A non-transitory computer readable storage medium storing instructions which, when executed on one or more programmed processors, carry out an audit process according to claim 1.

10. A method of transmitting a decryption key from a television service provider broadcast station to a television receiver, comprising:
   ascertaining a fingerprint of the television receiver, such fingerprint comprising a function of at least one of an equalizer coefficient and an amplifier gain at an installation site of the television receiver appliance;
   cryptographically combining a decryption key with the fingerprint to produce a code, where the fingerprint value is combined with the decryption key using an exclusive OR operation to produce the code; and
   transmitting the code to the television receiver.

11. The method according to claim 10, wherein the fingerprint is a function of equalizer coefficients and gain values of an adaptive equalizer and variable gain amplifiers of the television appliance, and wherein an equalizer coefficient is represented by $a \pm jb$, then $H_1$, the matrix of the most significant bits of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients; and
   the gain value of one of a plurality of variable gain amplifiers is given by k, then $H_2$, the matrix of at least the most significant bits of all gain values representing the state of the system at one point in time can be represented by:

$$H_2 = \begin{bmatrix} k_0 \\ k_1 \\ \ldots \\ k_l \end{bmatrix}$$

where l is the number of AGC coefficients; and
   wherein the fingerprint is given by $FP = Y(H_1, H_2)$.

12. A non-transitory computer readable storage medium storing instructions which, when executed on one or more programmed processors, carry out an audit process according to claim 10.

13. An implicitly authenticating television receiver appliance where the receiver appliance is connected to a television network having characteristics, comprising:
   a fingerprint generator that generates a fingerprint value, wherein the fingerprint value is a function of the television network characteristics at an authorized installation location, and wherein the fingerprint is a function of at least one of a gain value of a variable gain amplifier and an equalizer coefficient of an adaptive equalizer of the television receiver;
   a processor that performs a decryption function using the fingerprint value on a code received from a television transmission service headend to produce a decryption key, where the processor combines the fingerprint value with the code to produce the decryption key; and
   a decrypter that decrypts information using the decryption key.

14. The apparatus according to claim 13, wherein the fingerprint is a function of at least the most significant bits of equalizer coefficients and gain values of an adaptive equalizer and variable gain amplifiers of the television appliance, and wherein an equalizer coefficient is represented by a±jb, then $H_1$, the matrix of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients; and
   the gain value of one of a plurality of variable gain amplifiers is given by k, then $H_2$, the matrix of all gain values representing the state of the system at one point in time can be represented by:

$$H_2 = \begin{bmatrix} k_0 \\ k_1 \\ \ldots \\ k_l \end{bmatrix}$$

where l is the number of AGC coefficients; and
   wherein the fingerprint is given by $FP = Y(H_1, H_2)$.

15. The apparatus according to claim 13, wherein the fingerprint comprises equalizer coefficients of an adaptive equalizer of the television appliance.

16. The apparatus according to claim 13, wherein the fingerprint comprises gain coefficient values of a variable gain amplifier of the television appliance.

17. The apparatus according to claim 13, wherein the fingerprint comprises a function of at least one gain coefficient value of an AGC loop of the television appliance.

18. The apparatus according to claim 13, wherein the fingerprint comprises a weighted function of at least one of the following: at least one equalizer coefficient or a portion thereof of an adaptive equalizer of the television appliance and at least one gain coefficient value or a portion thereof of an AGC loop of the television appliance.

* * * * *